Patented Jan. 21, 1941

2,229,532

UNITED STATES PATENT OFFICE 2,229,532

PROCESS FOR THE PURIFICATION OF NITRO ALIPHATIC COMPOUNDS

Byron M. Vanderbilt, Terre Haute, Ind., assignor to Purdue Research Foundation, La Fayette, Ind., a corporation of Indiana No Drawing. Application July 3, 1937,
Serial No. 151,831

9 Claims. (Cl. 202—57)

My invention relates to a process for the purification of nitro aliphatic compounds, and, more particularly, to a process for the removal of color-forming bodies from nitroalcohols.

It is known that nitroparaffins may be prepared by the direct vapor phase nitration of saturated petroleum hydrocarbons, and that numerous nitro aliphatic compounds including nitroalcohols, may be prepared from such nitroparaffins. It has been found that the nitroalcohols, the nitroparaffins, and the other nitro aliphatic compounds prepared from the latter, may contain considerable amounts of color-forming bodies as impurities, and that such color-forming bodies may comprise materials imparting initial color to the nitro compounds, or they may be in the form of latent color-forming bodies which impart color to the nitro compounds on standing for considerable periods of time or on the application of heat, particularly in the presence of oxygen. The presence of color-forming bodies of these types has made difficult the preparation of pure water white products which will remain colorless on storage. In the past it has been assumed that these color-forming bodies were primarily aldehydes or aldehyde condensation products, and methods of purification have, up to the present time, been directed to removal of such materials by bisulfite treatment, or the like. Such treatments, however, have failed to remove all of the color-forming bodies and have been disadvantageous from a number of standpoints, particularly in the formation of emulsions which are extremely difficult to break.

I have now found that these color-forming bodies constitute, primarily, compounds different from aldehydes or simple aldehyde condensation products, and which may be removed by treatment entirely different from the methods designed for the removal of aldehyde bodies. There is evidence that these color-forming bodies comprise compounds of the nitroolefin type and unsaturated aldehyde derivatives, but it is to be distinctly understood that my invention is not to be limited to any particular theory regarding the constitution of these products.

The purification process of my present invention comprises, briefly, subjecting the impure nitroalcohols or other nitro compounds to the action of a polymerization inducing agent, and separating the resulting polymerized bodies from the nitro compounds. Since this process produces non-volatile products from more or less volatile impurities, it will be evident that it is particularly adapted for use in conjunction with a subsequent distillation step to effect the separation of the purified nitro compounds from the polymerized residue. However, my process is also applicable, although with somewhat less advantage, for use in conjunction with other purification steps such as crystallization, or the like.

While my process is particularly applicable to the purification of nitroalcohols, it is also applicable to any nitro aliphatic compound containing color-forming bodies of the types described above. As examples of such other compounds there may be mentioned the nitroparaffins, esters of nitroalcohols, ethers of nitroalcohols, and the like. In the production of these nitroalcohols, the procedures for their production tend to give rise to the formation of considerable amounts of color-forming bodies, and the color-forming bodies are sufficiently volatile to enable a preferred combination of polymerization and distillation to be employed. It is to be understood, however, that my invention is not to be limited to these particular types of compounds, but is generally applicable to nitro aliphatic compounds containing color-forming bodies of the types previously described.

The polymerization inducing agents utilized in my process may comprise any of the well known agents of this type, such as heat, light, oxygen, sulfuric acid, phosphoric acid, aluminum chloride, boron trifluoride, ozone, hydrogen peroxide, organic peroxides, and the like, or combinations of such agents. Any agent or catalyst known to promote polymerization and whose effectiveness is not destroyed by reaction with the nitroalcohol or other nitro aliphatic compound to be purified, under the conditions and concentrations employed, may satisfactorily be employed in my process.

The reaction conditions employed for the polymerization will, of course, depend upon the particular type of agent chosen and the nature of the nitro compound to be purified. Thus, when employing heat as the polymerizing agent a temperature should be chosen which will give rise to no decomposition of the nitro compound, and yet will be sufficiently high to bring about relatively rapid polymerization of the color-forming bodies. If other agents, such as peroxides, are used in conjunction with heat the temperature should be so controlled as to prevent unduly rapid decomposition of such materials. The time of operation will depend upon the concentration of color-forming bodies in the original material, and upon the polymerization inducing agent or agents employed. Simple preliminary experiments will serve to determine the minimum time of treatment necessary to polymerize satisfactorily the color-forming bodies.

I have found that an efficient and economic combination of polymerization inducing agents comprises combined heat treatment and aeration, preferably in the presence of light. This treatment may be effected by heating the impure nitro compound to a suitable temperature at which no decomposition takes place, and introducing air in a finely divided stream. In following this procedure I have found that in most cases a treatment of from one to three hours at 70–100° C. is satisfacory.

My invention will now be illustrated by the following specific examples:

*Example I*

A sample of 2-nitro-3-hexanol prepared from nitroethane and butyraldehyde was found to have a pronounced yellow color, and upon vacuum distillation it was found that the distillate retained a considerable proportion of this yellow color. The distillate was then aerated at 85° C. for two hours and was then redistilled under vacuum. The distillate in this case was water white and remained in the colorless condition on storage.

*Example II*

A sample of 3-methyl-3-nitro-4-heptanol prepared from 2-nitrobutane and butyraldehyde was found to have a pronounced yellow color which was partly retained in the distillate on vacuum distillation. The distillate was then subjected to aeration at 90° C. for one hour and redistilled under vacuum. The distillate in this case was water-white and remained colorless on storage.

*Example III*

A sample of 3-nitro-2-pentanol prepared from 1-nitropropane and acetaldehyde was found to have a pronounced yellow color, and remained pale yellow after vacuum distillation. The distillate was then treated with 0.5% by volume of 95% sulfuric acid for one hour at 50° C. with slow agitation. On redistillation a water-white distillate was secured, which remained colorless on storage.

It is to be understood, of course, that the above examples are illustrative only and are not to be construed as limiting the scope of my invention. As has been previously pointed out, my invention is applicable generally to nitro aliphatic compounds containing color-forming bodies of the type described, and may be carried out by the use of polymerization inducing agents other than the particular combination utilized in these examples. It will also be apparent that my process is subject to numerous modifications or combinations with other purification steps. For example, when employing air or oxygen as one of the polymerization inducing agents in my process, it would be possible to introduce an oxidation catalyst to effect simultaneous removal of other types of impurities such as simple aldehyde bodies. Any such modifications of procedure, and the use of any equivalents of the materials specified above, are to be included within the scope of my invention.

My invention now having been described, what I claim is:

1. In a process for the purification of a saturated aliphatic nitro compound of the class consisting of nitroparaffins obtained by direct vapor phase nitration of saturated petroleum hydrocarbons, said nitroparaffins containing color-forming bodies as impurities, and derivatives of such nitroparaffins, said derivatives containing color-forming bodies as impurities, the improvement comprising treating said impure nitro compound to polymerize substantially all of said color-forming bodies without substantial decomposition of said nitro compound, and subsequently separating said nitro compound substantially free from the resulting polymerized material.

2. In a process for the purification of a saturated aliphatic nitro compound of the class consisting of nitroparaffins obtained by direct vapor phase nitration of saturated petroleum hydrocarbons, said nitroparaffins containing color-forming bodies as impurities, and derivatives of such nitroparaffins, said derivatives containing color-forming bodies as impurities, the improvement comprising treating said impure nitro compound to polymerize substantially all of said color-forming bodies to non-volatile products without substantial decomposition of said nitro compound, and subsequently distilling the treated nitro compound to recover the nitro compound substantially free from the resulting polymerized material.

3. The process of claim 2 in which the impure nitro compound is a nitroparaffin.

4. The process of claim 2 in which the impure compound is a nitroalcohol.

5. The process of claim 2 in which the impure nitro compound is an ester of a nitroalcohol.

6. The process of claim 2 in which the polymerization is effected by heating the impure nitro compound.

7. The process of claim 2 in which the polymerization is effected by heating and aerating the impure nitro compound.

8. In a process for the purification of a saturated aliphatic nitro compound of the class consisting of nitroparaffins obtained by direct vapor phase nitration of saturated petroleum hydrocarbons, said nitroparaffins containing color-forming bodies as impurities, and derivatives of such nitroparaffins, said derivatives containing color-forming bodies as impurities, the improvement comprising aerating said impure nitro compound at a temperature of 70–100° C., for a period of 1 to 3 hours to polymerize substantially all of said color-forming bodies to non-volatile products, and subsequently distilling said treated nitro compound to recover said nitro compound substantially free from the resulting polymerized material.

9. The process of claim 8 in which the impure nitro compound is a nitroalcohol.

BYRON M. VANDERBILT.